United States Patent [19]

Rogers et al.

[11] Patent Number: 5,999,867
[45] Date of Patent: Dec. 7, 1999

[54] COMPUTER INTERFACE BOARD FOR ELECTRONIC AUTOMOTIVE VEHICLE SERVICE EQUIPMENT

[75] Inventors: Steven W. Rogers; Matthew T. Foreman, both of Conway; George M. Gill, Vilonia, all of Ark.

[73] Assignee: Snap-On Technologies, Inc., Lincolnshire, Ill.

[21] Appl. No.: 08/903,312

[22] Filed: Jul. 30, 1997

Related U.S. Application Data

[62] Division of application No. 08/302,075, Sep. 7, 1994, Pat. No. 5,734,569, which is a continuation of application No. 07/817,250, Jan. 6, 1992, abandoned.

[51] Int. Cl.$^6$ ................................................. G01B 11/26
[52] U.S. Cl. ............................... 701/29; 701/33; 33/288
[58] Field of Search .......................... 701/29, 33; 33/286, 33/288, 203.18; 364/528.14

[56] References Cited

U.S. PATENT DOCUMENTS

| | | |
|---|---|---|
| 4,047,159 | 9/1977 | Boudry . |
| 4,344,136 | 8/1982 | Panik . |
| 4,373,116 | 2/1983 | Shimizu et al. . |
| 4,402,603 | 9/1983 | Lill . |
| 4,404,639 | 9/1983 | McGuire et al. . |
| 4,523,844 | 6/1985 | Titsworth . |
| 4,594,789 | 6/1986 | Marino . |
| 4,688,171 | 8/1987 | Selim . |
| 4,745,469 | 5/1988 | Waldecker et al. . |
| 4,757,463 | 7/1988 | Ballou et al. . |
| 4,761,749 | 8/1988 | Titsworth et al. . |
| 4,796,206 | 1/1989 | Boscove et al. . |
| 4,939,652 | 7/1990 | Steiner . |
| 5,003,476 | 3/1991 | Abe . |
| 5,005,129 | 4/1991 | Abe et al. . |
| 5,040,117 | 8/1991 | Shyu et al. . |
| 5,041,976 | 8/1991 | Marko et al. . |
| 5,050,080 | 9/1991 | Abe . |
| 5,058,044 | 10/1991 | Stewart et al. . |
| 5,065,321 | 11/1991 | Bezos et al. . |
| 5,068,792 | 11/1991 | Lehr et al. . |
| 5,072,391 | 12/1991 | Abe . |
| 5,208,646 | 5/1993 | Rogers et al. ........................... 33/288 |
| 5,239,470 | 8/1993 | Komatsu . |
| 5,313,711 | 5/1994 | Kling, III et al. .................. 33/203.18 |

FOREIGN PATENT DOCUMENTS

| | | |
|---|---|---|
| 2570178 | 3/1996 | France . |
| 3810239 | 10/1988 | Germany . |
| 4107052 | 9/1992 | Germany . |

OTHER PUBLICATIONS

"Entwurf eines Standardisierten Interfaces zur Kraftfahrzeugdiagnose", pp. 11–17, Harald Fischer, Der Electroniker No. 8/1991.

"Erfassen, Analgsieren, Ueberwachen und Darstellen mit PC–Gestuetzer Messtechnik", pp. 316–318, M&P, Aug. 1991.

"Immer Komforabler: Messdatenauswertung per PC", pp. 75–79, Wolfgang Hascher, Elektronik 13/1991.

OPTO–PLUS Model 604 brochure, Apr. 1989.

OPTO–PLUS 604 Technical Reference, 1$^{st}$ Edition, Apr. 1989.

*Primary Examiner*—William A. Cuchlinski, Jr.
*Assistant Examiner*—Ed Pipala
*Attorney, Agent, or Firm*—McDermott, Will & Emery

[57] ABSTRACT

An electronic automotive vehicle service equipment system includes a computer interface board adapted for installation into a non-dedicated, general purpose computer to serve as the central processor for the automotive service system, or as a component of multiple systems, while enabling the computer to also be available for other applications. The interface board provides microprocessors for controlling various data receiving and transmitting functions through multiple ports between the computer instruments integral to the vehicle service system.

23 Claims, 3 Drawing Sheets

COMPUTER INTERFACE BOARD FOR ELECTRONIC AUTOMOTIVE VEHICLE SERVICE EQUIPMENT

This application is a division of Ser. No. 08/302,075, filed Sep. 7, 1994, now U.S. Pat. No. 5,734,569 which is a continuation of Ser. No. 07/817,250, filed Jan. 6, 1992, now abandoned.

TECHNICAL FIELD

The present invention relates to the utilization of general purpose computers in combination with electronic sensing devices to provide apparatus to facilitate servicing of automotive vehicles. More particularly, the present invention relates to interfacing of electronic sensing devices with a general purpose computer to provide apparatus to facilitate alignment of automotive vehicle wheels, balancing of automotive vehicle wheels, and truing of automotive vehicle brake rotors on brake lathes.

BACKGROUND OF THE INVENTION

Analog and digital electronic sensing devices are used in combination with microprocessor circuits for many applications in the automotive vehicle service industry. For example, electronic automotive vehicle wheel alignment apparatus known in the art includes multiple electronic sensing heads which are suspended from frames releasably clamped to the wheels of an automotive vehicle and which contain alignment sensor devices to provide data relating to various angles defined between the wheel plane of a selected individual wheel and the wheel plane of another selected wheel, true vertical, or an arbitrary reference.

Electronic aligners of the prior art have generally utilized special purpose microprocessors or dedicated general purpose computers to process the electronic data signals generated by the sensing heads, preferably, for display on a video monitor, to facilitate alignment of the vehicle wheels. Aligners of the prior art utilizing dedicated general purpose computers gather data from the alignment heads sequentially, one at a time, during repetitive polling cycles to update the video display as measurements are taken and adjustments are made during the course of an alignment procedure. These aligners generally suffer from slow response to alignment changes. The long data update cycle required between computations due to the sequential polling process may result in interruption or a delay of the display of wheel alignment parameters on the system's visual monitor as wheel plane relationships are changed and adjustments made in the course of performing an alignment.

Electronic automotive service equipment utilizing a dedicated general purpose computer do not allow the CPU of the computer to be utilized for other automotive vehicle service apparatus or for other business computing applications.

DISCLOSURE OF THE INVENTION

It is an object of the present invention to allow use of a general purpose computer to provide the central processor unit for an electronic automotive service apparatus such as a wheel aligner, wheel balancer, or the like.

It is a further object of the present invention to allow the use of a single general purpose computer as a component of a plurality of automotive service apparatus.

It is another object of the present invention to allow the adaption and use of a nondedicated general purpose computer for automotive service apparatus so that the general purpose computer may also be used on a continuing basis for other business applications.

It is yet a further object of the present invention to provide a wheel alignment apparatus capable of producing a continuous uninterpreted visual display of instant wheel alignment parameters as dirigible wheels are repositioned, the suspension system is exercised, and alignment adjustments are made on a vehicle during an alignment process.

An interface board comprising an embodiment of the present invention includes input ports for receiving analog and digital data signals from automotive vehicle service system data sensors, a micro controller for controlling functions of the interface board and processing data, and a multiport random access memory (RAM) for receiving sensor data through a first port, storing the sensor data, and providing access to the stored data to the CPU of the general purpose computer by a second port. The two port RAM includes means for storing a data status signal having a first and second signal state and which may be placed in the first state by the micro controller and placed in the second state by the CPU of the general purpose computer.

During operation of the interface board comprising the present invention, the micro controller acquires data from all of the service system sensors, processes the data to a preferred content and format, stores the data in the RAM through a first RAM port and sets the signal to its first state causing an interrupt signal to be sent to the CPU. The CPU accesses data in the RAM through a second port and sets the signal to the second state after acquiring data.

A preferred embodiment of the interface board of the present invention includes a PROM from which the CPU can read system files, a first EEPROM accessible to the CPU for storing user configuration data, and a second EEPROM on the interface board side of the dual port RAM for storing control data. The version of the control data stored on the second EEPROM may be determined by the CPU and the control data upgraded as appropriate.

One embodiment of the interface board of the present invention provides interfacing of a general purpose computer with a plurality of automotive vehicle wheel alignment data sensing heads to facilitate wheel alignment on automotive vehicles and includes a multiport universal asynchronous receiver-transmitter (UART) for simultaneously polling and receiving data from each of the data sensing heads. The micro controller of the interface board controls the UART and RAM, periodically causing the UART to poll all of the alignment sensing heads simultaneously and storing data received from the sensors in the multiport RAM.

The method of interfacing the CPU of a general purpose computer with a plurality of automotive vehicle wheel alignment sensing heads utilized by the aligner embodiment includes the steps of acquiring wheel alignment data from all of the alignment sensor heads simultaneously, storing the wheel alignment data in the multiport RAM by accessing the RAM through a first port, and generating an interrupt signal to cause the CPU of the general purpose computer to access the newly stored data through a second port.

These and other advantages of the invention will become evident upon study of the following detailed description together with the drawings.

DETAILED DESCRIPTION

Figure 1:
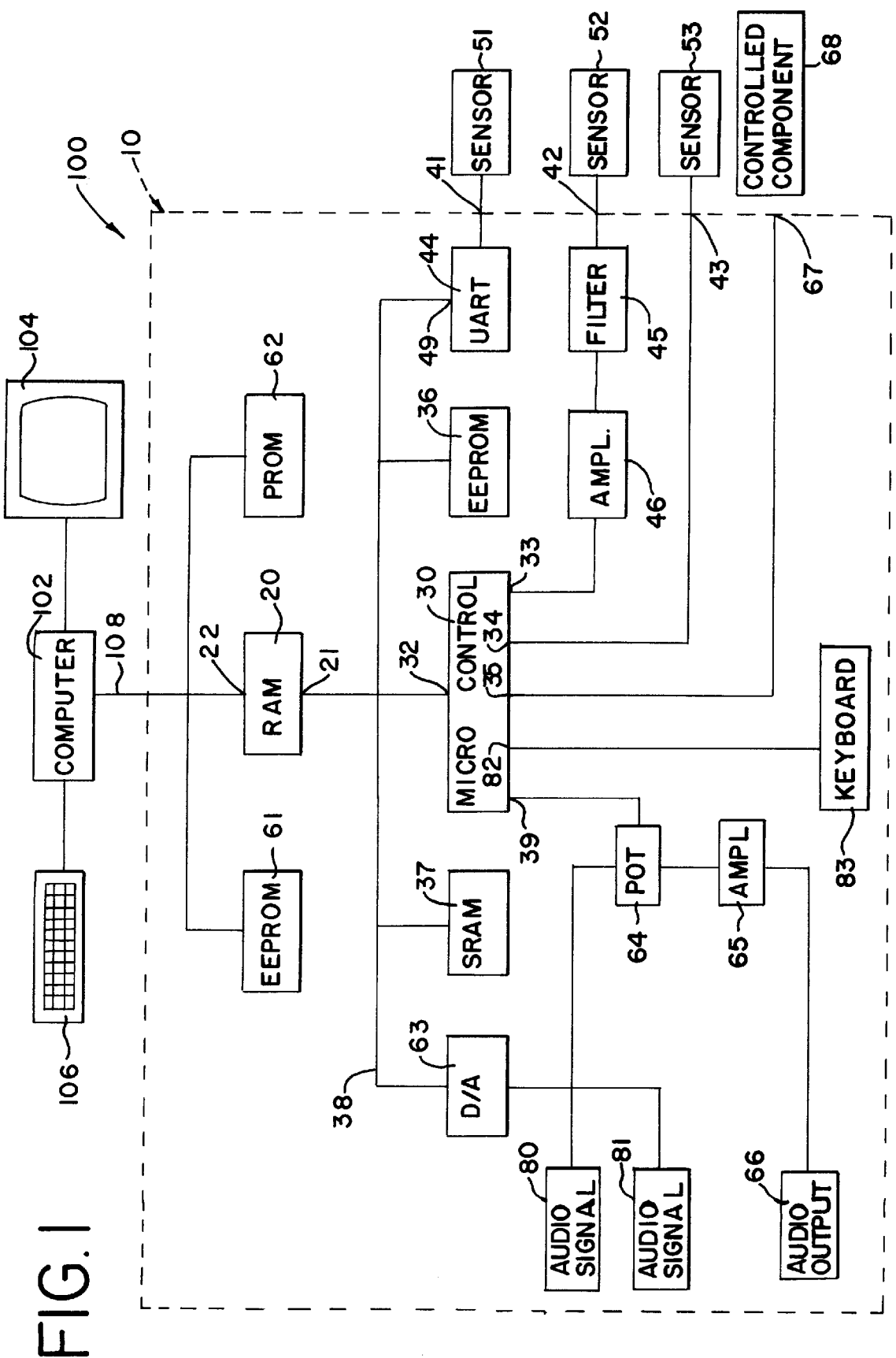
FIG. 1 is a schematic illustration of an interface board comprising an embodiment of the present invention.

Interface board 10 for interfacing general purpose computer 102 with automotive vehicle data sensors to facilitate servicing of an automotive vehicles and comprising an embodiment of the present invention is shown schematically in FIG. 1. Interface board 10 of automotive service apparatus 100 interfaces general purpose computer 102 with data acquisition components, which may be a keyboard input, stored system files or various sensors, such as exemplary sensors 51, 52 and 53. Micro controller 30 of interface board 10 controls the function of interface board 10, accessing data from sensors 51, 52 and 53, processing data and storing data in dual port RAM 20. Sensor 51 may be a data communication device, for example, a serial communication device transmitting a signal in RS-232C format through port 41 of board 10 to UART 44, which may be a multiport UART. Data from sensor 51 may be accessed by micro controller 30 via internal port 32 and interface board bus 38, UART 44 and board port 41. Exemplary sensor 52 may be a crystal transducer, potentiometer, infrared receiver or the like. Data from sensor 52 is accessed by micro controller 30 through interior analog port 33 via interface board port 42, filter 45, and amplifier 46. Sensor 53 may be, for example, an optical encoder, infrared control device or the like producing a digital output signal which may be received by micro controller 30 through port 34 via interface board port 43.

General purpose computer 102 may be any of the many commercially available general purpose computers used for running financial, technical and other software programs, for example, IBM and IBM compatible PC computers or MacIntosh-type computers, and is preferably equipped with visual display monitor 104 and keyboard 106. General purpose computer 102, as envisioned for use with this invention, has accessible synchronous parallel data paths, typically, a computer expansion bus. Interface board 10 may be configured for installation in an expansion slot commonly provided in such general purpose computers in the same manner as interface boards for data storage devices, modems and other peripheral equipment commonly available for use with such computers.

Port 22 of multiport RAM 20 of interface board 10 is in communication with computer bus 108 of computer 102 and port 21 of multiport RAM 20 is in communication with interface board bus 38. Multiport RAM 20 of the exemplary embodiment is a dual port RAM, but a RAM with a greater number of ports might be used. EEPROM 61 of interface board 10 is in direct communication with bus 108 of computer 102 and provides storage for system configuration data such as might be provided by individual users for their particular applications. PROM 62 of interface board 10 is also in direct communication with bus 108 of computer 102 and contains systems files so that computer 102 may be booted in the absence of hard drives, floppy disk drives or other storage media capable of storing systems files. EEPROM 36 is in communication with interface board bus 38 and provides storage for control data for directing operation of micro controller 30. SRAM 37 is also in direct communication with interface board bus 38 and provides interim storage for micro controller 30 for use in control and data processing operations.

When operation of exemplary automotive vehicle service apparatus 100 is initiated, computer 102 inquires of interface board 10 the version of the control data. Micro controller 30 accesses EEPROM 36 and delivers the current version code to multiport RAM 20. The CPU of computer 102 then determines if the version delivered is the latest. If it is not, CPU 102 causes micro controller 30 to accept new control data to be stored in EEPROM 36. Operation of micro controller 30 is then initiated in accordance with the new control data stored in EEPROM 36.

Once operation of micro controller 30 is initiated, except when operation of micro controller 30 is interrupted by a signal from general purpose computer 102, micro controller 30 executes repetitive cycles during which microprocessor 30 gathers data from each of sensors 51, 52 and 53, processes the data to a preferred content and format, and stores the data via port 21 in dual port RAM 20.

At the end of each scanning cycle, at the time data is stored in dual port RAM 20, micro controller 30 also writes a byte to a special location in dual port RAM 20 to indicate to the CPU of computer 102 that new data has been placed in RAM 20. Writing of the signal byte causes an interrupt signal to be transmitted to the CPU of computer 102 to cause the CPU to pick up new data from dual port RAM 20 via port 22. Immediately subsequent to picking up data from RAM 20, the CPU of computer 102 erases the signal byte. In the course of performing each repetitive scan cycle, micro controller 30 of exemplary interface board 10 will place new data in dual port RAM 20 regardless of the signal condition of the special storage location.

It should be noted that the function of the dual port RAM may be performed by circuitry where by a latch is addressed by either the general purpose computer CPU or by the interface board micro controller. This may be accomplished by using a bus transceiver between the latch and micro controller 30 and a similar bus transceiver between the latch and the CPU. In one state, the bus transceiver and the latch would be controlled by micro controller 30. In another state, a similar bus transceiver, between the CPU and the latch, along with the latch, would be controlled by the CPU. In a like manner, the function of the dual port RAM could be performed by circuitry whereby interface board micro controller 30 requests the use of the bus of the general purpose computer CPU by way of a bus request control signal input provided by the CPU. In this embodiment, the CPU periodically relinquishes control of the bus to interface board micro controller 30 and, as it does so, provides a bus request acknowledge signal to the micro controller. Micro controller 30 controls the bus as long as it continues to hold the bus request input signal active. While micro controller 30 has control of the bus, sensor data can be stored in the CPU's memory by micro controller 30. Likewise, data can be obtained by micro controller 30 by reading specific memory locations in the CPU's memory space. Communication between micro controller 30 and the CPU may be achieved by other circuit arrangements in addition to these exemplary circuits.

Elements may be included on interface board 10 to provide additional features for automotive vehicle service apparatus, such as audio signal capabilities to signal when certain adjustment criteria are achieved. In such a case, controller microprocessor 30 will continually execute scanning cycles, polling all sensors and processing and storing data except when micro controller 30 receives an interrupt signal from the CPU of general purpose computer 102 to cause micro controller 30 to control an alternative function. After completion of an alternative control function, microprocessor 30 will again resume polling cyclically.

An audio section of exemplary interface board 10 includes digital to analog converter 63 controlled by micro controller 30 via internal bus 38 to produce an analog audio signal. This analog signal is combined with analog audio input from audio output devices 80 and 81. The combination is connected to an input of digitally controlled potentiometer 64. Digitally controlled potentiometer 64 has an internal EEPROM to store a potentiometer setting. The output of potentiometer 64 is connected to fixed gain amplifier 65 which is in-turn connected to analog audio output device 66. Micro controller 30 may control the setting of potentiometer 64 through output port 37 to adjust the volume of the signal at analog output device 66.

Keyboard 83 may be connected to micro controller 30 through port 82. Keyboard 83 may be used to input parameters of vehicle characteristics such as wheel and tire data. Keyboard 83 may be more rugged than keyboards, such as keyboard 106, commonly available for use with the general purpose computers. The keyboard data would be passed to the general purpose computer in the same manner as the sensor data.

Interface board 10 may also control output components or devices 68 for example, a relay, display, or motor controller. Such output devices connect to the interface board 10 via board port 67 and to micro controller 30 via port 35.

Figure 2:
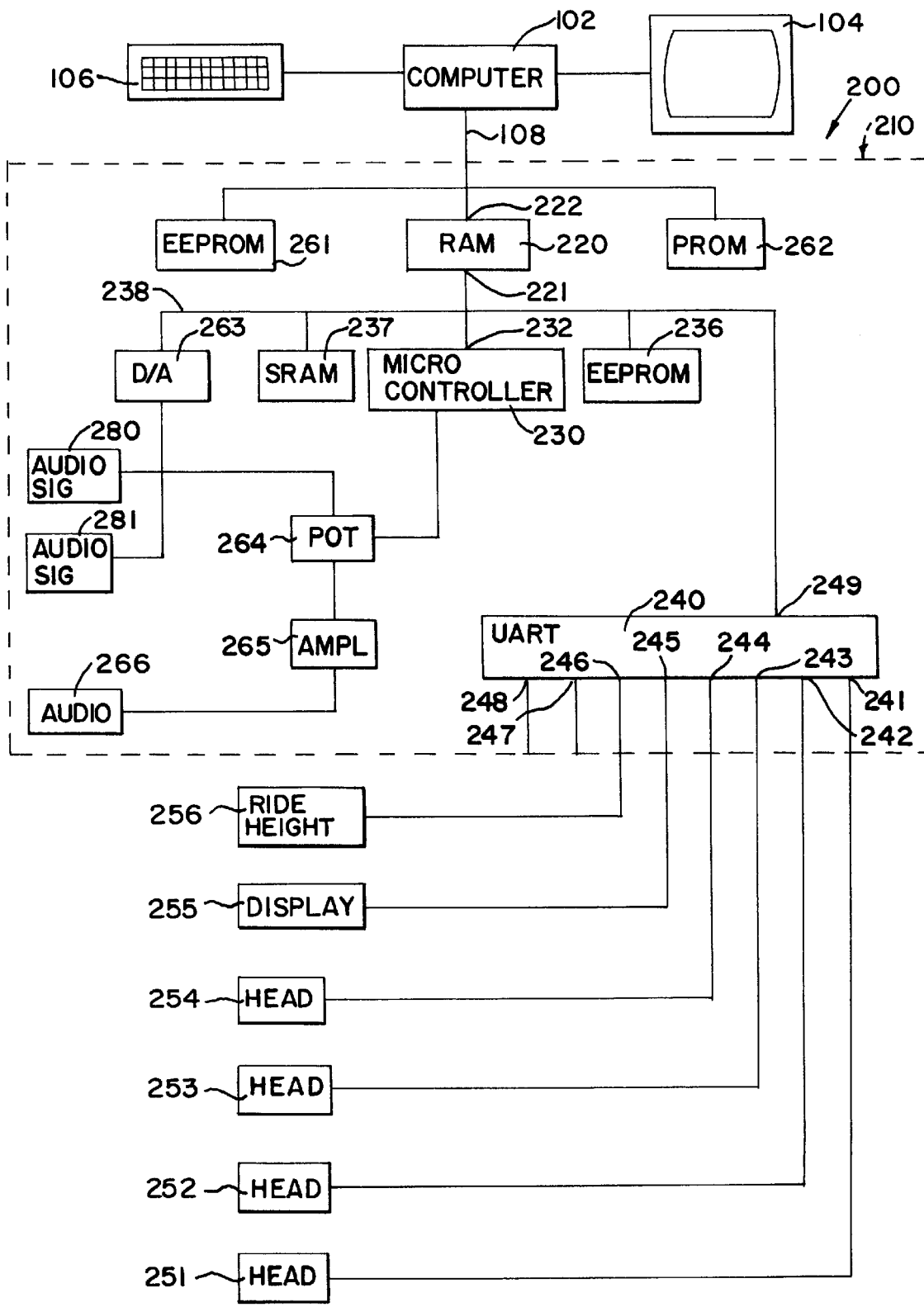
FIG. 2 is a schematic illustration of an interface board comprising an embodiment of the present invention for facilitating wheel alignment.

Exemplary interface board 210 of automotive vehicle wheel aligner 200 comprising a preferred embodiment of the present invention, is shown schematically in FIG. 2 and includes dual port RAM 220, micro controller 230 and octal UART 240 connected to interface board bus 238 at internal ports 221, 232 and 249 respectively.

Sensing heads 251 through 254 are connected to UART ports 241 through 244 respectively. Sensing heads 251 through 254 are mounted on the wheels of an automotive vehicle by removable clamping frames well known in the art, and may include any sensing device known in the art for measuring wheel plane angles with respect to one another, with respect to the vertical, or with respect to other references. For example, heads 251 through 254 may each include an inclinometer, sensors for sensing relative angles from optical beams projected between sensing heads or potentiometers for indicating angles relative to tension vectors of elastic chords stretched between two sensor heads. Heads 251 through 254 may also include microprocessor boards for limited processing and packaging of sensed data prior to transmission to corresponding UART ports 241 through 244, respectively. While UART 240 of exemplary interface board 210 is an octal UART, a multiport UART of any number of ports may be utilized. UART ports not used for wheel angle sensing devices may, instead, be utilized for data communication with other peripheral devices, for example, ride height measuring device 256 and remote control and display device 255, which may be of an infrared or other cordless configuration.

Multiport RAM 220 of exemplary interface board 210 is a dual port RAM with first port 221 in communication with board bus 238 of interface board 210 and second port 222 in communication with computer bus 108 of general purpose computer 102.

Micro controller 230 controls the function of multiport UART 240, processes data acquired from the sensors through UART 240 to a desired format for transmission to the CPU of computer 102, and stores processed data in RAM 220, through port 221, all in accordance with program instructions stored in EEPROM 236.

Once interface board 210 is properly installed with port 222 of dual port RAM 220 connected to bus 108 of general purpose computer 102, appropriate alignment program software is loaded into computer 102, and alignment sensors are connected to appropriate ports of UART 240. Interface board 210, computer 102 and sensors 251 through 256 provide a complete, functional wheel alignment system 200 upon launching of the wheel alignment software.

Except when interrupted by signals from computer 102, control micro controller 230 executes repetitive scanning cycles in which micro controller 230 signals UART 240 to poll and receive data from sensing devices 251 through 254, simultaneously, via ports 241 through 244, respectively. Data packets received through the ports of UART 240 are transmitted via bus 238 and processed by micro controller 230 to a desired scale and format. Micro controller 230 then stores the data in dual port RAM 220 by accessing RAM 220 through port 221.

Figure 3:
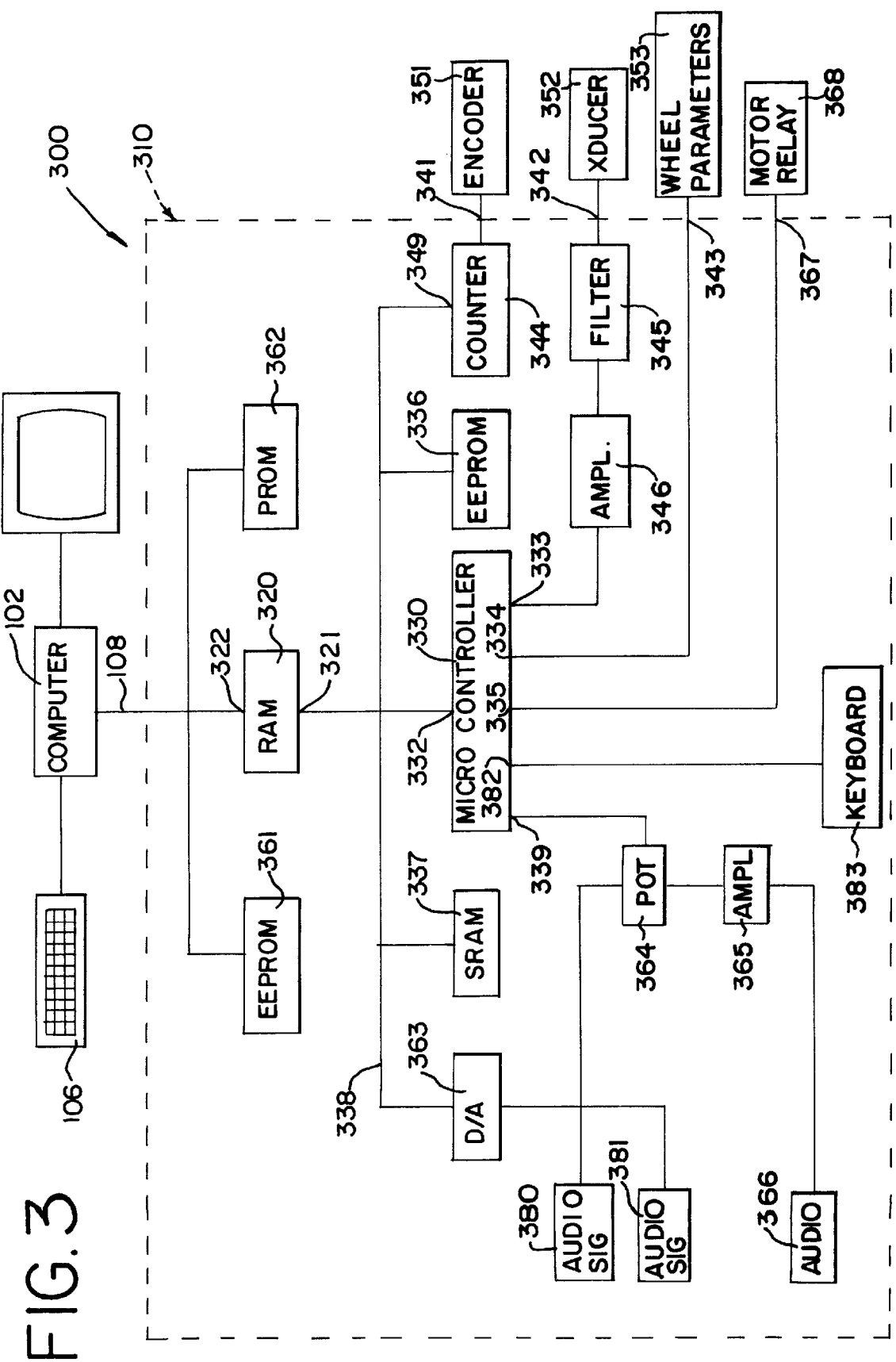
FIG. 3 is a schematic illustration of an interface board comprising an embodiment of the present invention for facilitating wheel balancing.

Exemplary interface board 310 of automotive vehicle wheel balancer 300, comprising an embodiment of the present invention, is shown schematically in FIG. 3 and includes dual port RAM 320, a micro controller 330 and encoder counter 344 connected to interface board bus 338 at internal ports 321, 332, and 349 respectively. Optical encoder 351, generates data related to wheel speed and angular wheel position accessed by micro controller 330 through encoder counter 344 and interface board port 341. Micro controller 330 may access data relating to imbalance forces from crystal transducer 352, wheel parameter sensors 353 through ports 342 and 343 respectively. Micro controller 330 may generate motor relay control signals at internal port 335 to control motor relay 368 through interface board port 367.

While exemplary interface boards comprising preferred embodiments of the present invention have been shown, it will be understood, of course, that the invention is not limited to these embodiments. Modifications may be made by those skilled in the art, particularly in view of the foregoing teachings. For example, an interface board comprising an embodiment of the present invention might support only a lathe for finishing brake members, and include analog input ports for brake member cutting tool temperature sensors, digital input ports to sense lathe drive motor speed and cutting tool position, and provide digital outputs to control lathe functions, for example, lathe drive motor speed. It is, therefore, contemplated that the appended claims cover any such modification which incorporates the inventive features of the present invention or which encompasses the spirit and scope of the invention.

We claim:

1. A computer system, comprising:

a general purpose computer having a system bus, a central processing unit connected to the system bus and at least one expansion slot connected to the system bus;

at least one sensor for generating data relating to the angular orientation of one or more wheels of a vehicle;

an interface card comprising an interface bus having synchronous parallel data paths, the interface card being adapted to be inserted into the expansion slot to thereby connect the interface bus to the system bus;

the interface card further comprising an input port coupled to the sensor for receiving the data from the sensor and a processor coupled to the input port and the interface bus for controlling the reception of the data from the sensor and making the data available on the interface bus; and wherein the the central processing unit is configured to receive the data over the interface bus and the system bus and compute alignment values for the vehicle from the data.

2. The system of claim 1, wherein the input port comprises a serial port coupled to the sensors with a serial bus.

3. The system of claim 1, wherein the input port comprises a UART coupled to the interface bus.

4. The system of claim 1, further comprising means for effecting communication of the data from the processor means to the system bus.

5. The system of claim 1, further comprising at least one dual port RAM coupled to the interface bus for effecting communication of the data from the processor means to the system bus.

6. The system of claim 1, further comprising at least one latch coupled to the interface bus for effecting communication of the data from the processor means to the system bus.

7. The system of claim 1, wherein:

the interface card is further configured for generating a signal to the central processing unit indicating that the data is available; and the central processing unit is configured to fetch the data in response to the signal indicating that the data is available.

8. A vehicle wheel aligner for use with at least one sensor for generating data relating to the angular orientation of one or more wheels of a vehicle comprising:

a general purpose computer having a system bus, a central processing unit connected to the system bus and at least one expansion slot connected to the system bus;

an interface card comprising an interface bus having synchronous parallel data paths, the interface card being adapted to be inserted into the expansion slot to thereby connect the interface bus to the system bus;

the interface card further comprising an input port coupled to the sensor for receiving the data from the sensor and a processor coupled to the input port and the interface bus for controlling the reception of the data from the sensor and making the data available on the interface bus; and wherein the central processing unit is configured to receive the data over the interface bus and the system bus and compute alignment values for the vehicle from the data.

9. The vehicle wheel aligner of claim 8, wherein the input port comprises a serial port coupled to the sensors with a serial bus.

10. The vehicle wheel aligner of claim 8, wherein the input means comprises a UART coupled to the interface bus.

11. The vehicle wheel aligner of claim 8, further comprising means for effecting communication of the data from the processor means to the system bus.

12. The vehicle wheel aligner of claim 8, further comprising at least one dual port RAM coupled to the interface bus for effecting communication of the data from the processor means to the system bus.

13. The vehicle wheel aligner of claim 8, further comprising at least one latch coupled to the interface bus for effecting communication of the data from the processor means to the system bus.

14. The vehicle wheel aligner of claim 8, wherein:

the interface card is further configured for generating a signal to the central processing unit indicating that the data is available; and the central processing unit is configured to fetch the data in response to the signal indicating that the data is available.

15. A vehicle wheel aligner having at least one sensor for generating data relating to the angular orientation of one or more wheels of a vehicle, comprising:

a general purpose computer having a system bus, a central processing unit connected to the system bus and at least one expansion slot connected to the system bus;

an interface card comprising an interface bus having synchronous parallel data paths, the interface card being adapted to be inserted into the expansion slot to thereby connect the interface bus to the system bus;

the interface card further comprising an input port coupled to the sensor for receiving the data from the sensor, a processor coupled to the input port and the interface bus for controlling the reception of the data from the sensor and making the data available on the interface bus, and at least one latch for effecting communication of the data from the processor means to the system bus; and wherein the central processing unit is configured to receive the data from said at least one latch and compute alignment values for the vehicle from the data.

16. The vehicle wheel aligner of claim 15, wherein:

the interface card is further configured for generating a signal to the central processing unit indicating that the data is available; and the central processing unit is configured to fetch the data in response to the signal indicating that the data is available.

17. A vehicle wheel aligner having at least one sensor for generating data relating to the angular orientation of one or more wheels of a vehicle, comprising:

a general purpose computer having a system bus, a central processing unit connected to the system bus and at least one expansion slot connected to the system bus;

an interface card comprising an interface bus having synchronous parallel data paths, the interface card being adapted to be inserted into the expansion slot to thereby connect the interface bus to the system bus;

the interface card further comprising an input port coupled to the sensor for receiving the data from the sensor and a processor coupled to the input port and having an accessible processor bus coupled to the interface bus for controlling the reception of the data from the sensor and for making the data available to the interface bus over the processor bus; and wherein the central processing unit is configured to receive the data over the interface bus and the system bus and compute alignment values for the vehicle from the data.

18. The vehicle wheel aligner of claim 17, wherein the input port comprises a serial port coupled to the sensors with a serial bus.

19. The vehicle wheel aligner of claim 17, wherein the input port comprises a UART coupled to the interface bus.

20. The vehicle wheel aligner of claim 17, further comprising means for effecting communication of the data from the processor means to the system bus.

21. The vehicle wheel aligner of claim 17, further comprising at least one dual port RAM coupled to the interface bus for effecting communication of the data from the processor means to the system bus.

22. The vehicle wheel aligner of claim 17, further comprising at least one latch coupled to the interface bus for effecting communication of the data from the processor means to the system bus.

23. The vehicle wheel aligner of claim 17, wherein:

the interface card is further configured for generating a signal to the central processing unit indicating that the data is available; and the central processing unit is configured to fetch the data in response to the signal indicating that the data is available.

* * * * *